Dec. 13, 1927.

A. LANZ 1,652,534

FLEXIBLE COUPLING

Filed June 24, 1926

Inventor:
Arthur Lanz.

Patented Dec. 13, 1927.

1,652,534

UNITED STATES PATENT OFFICE.

ARTHUR LANZ, OF OERLIKON, SWITZERLAND.

FLEXIBLE COUPLING.

Application filed June 24, 1926, Serial No. 118,375, and in Switzerland November 2, 1925.

My invention relates to flexible couplings particularly adapted to connect shafts out of line, moving with its supporting bearings to and from a limited eccentric position. The object of my invention is to provide suitable coupling means, allowing revolving shafts to oscillate against each other without harmful backlashes and its resulting vibrations, to equalize inaccuracies in the details, to provide at the same time flexible yielding means to reduce undue strains from the rotating masses, shocks and overloads in the power transmission.

To attain these objects one shaft is carrying a coupling member with diagonal opposite driving pins. Two driving rods are swiveled each one with one end on said driving pins. Pivotally inserted between the diagonal opposite other ends of the two driving rods is a connection. The two driving rods and said connection form a driving frame revolving with said shaft and coupling member.

On said driving frame suitable means are provided to engage slidably another coupling member secured to and revolving with the other shaft. While the coupling may be used for a great variety of purposes it is specially suitable for individual drives in electric locomotives. In this form of power transmission the driving coupling member is on a shaft oscillating with the spring supported main frames and the driven coupling member is exposed to the inequalities of the tracks. It is the object of my invention to minimize objectionable reactions upon the drive during oscillations, to secure a balanced power transmission and to provide at the same time an efficient equalizer against shocks and overloads. Additional objects of the invention will appear in the following specification in which some of the preferred forms of my invention are described.

Figure 1:
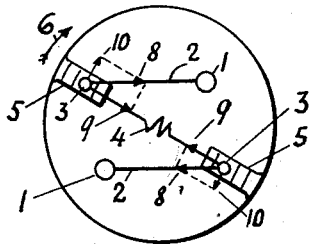
Figure 2:
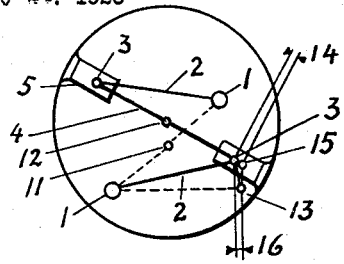
Figure 3:
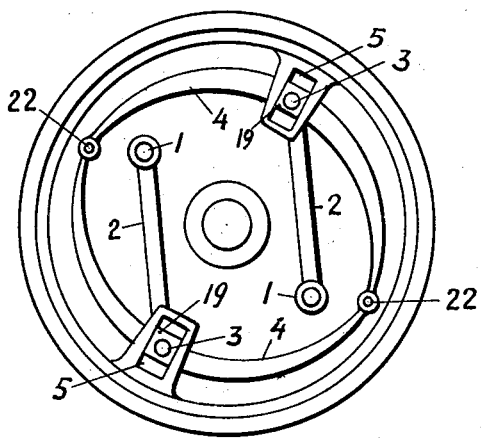
Figure 4:
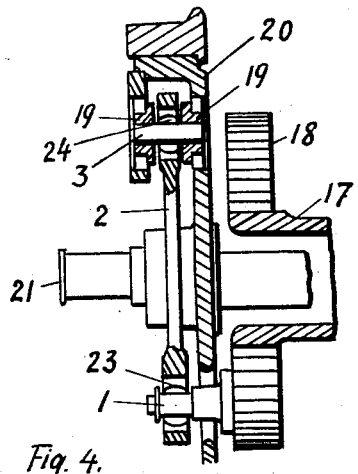
Figure 5:
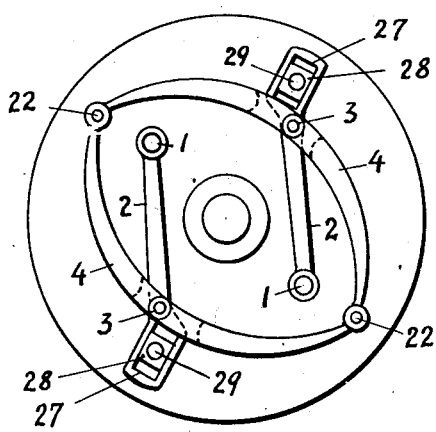
Figure 6:
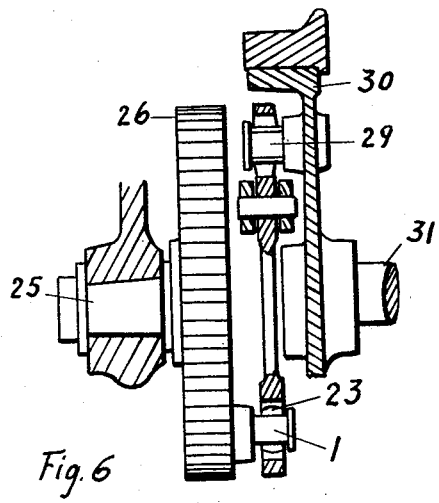

Referring to the drawing in which similar reference characters indicate the same parts in the several figures of the drawing, Fig. 1 is a diagrammatic outline arrangement of the coupling; Fig. 2 is a diagrammatic outline arrangement to explain the working manner of the coupling in oscillations of the shafts; Fig. 3 is an end view of one form of my coupling; Fig. 4 shows a partial cross section through coupling shown in Fig. 3; Fig. 5 is an end view of another form of the coupling; Fig. 6 is a partial cross section through coupling shown in Fig. 5.

Referring now to the diagrammatic outline of the coupling in Fig. 1, two diagonal opposite driving pins 1 are carried by a coupling member secured to one shaft. Two driving rods 2 are swiveled each one with one end on pins 1.

Inserted between the diagonal opposite other ends 3 of the driving rods 2 is a connection 4. In some of my couplings the connection 4 has the form of a strut, in other forms it is yieldable. Driving rods 2 and connection 4 form together a driving frame revolving on pins 1. The driving frame preferably with its ends 3 engages slidably slots 5 in a coupling member secured to and revolving with the other shaft. Revolving in the direction of arrow 6, with the shaft carrying pins 1 and the driving frame 2, 4, 2 as driver, pins 3 engage and drive the other shaft and coupling member in slots 5. The corresponding diagram of forces is indicated in Fig. 1, arrows 8 representing the pull in driving rods 2, arrows 9 the compression in connection 4 and arrows 10 the circumferential driving forces of the driving frame against slots 5 in a coupling member of the other shaft. Two forces 9 balance each other in connection 4. In the opposite sense of rotation the two forces are on tension. The connection 4 is thus subject to tension and compression, according to the sense of rotation or transmission of power. If now connection 4 is of a yieldable form, all inequalities, shocks, vibrations, changes in power are cushioned and equalized by the yield.

In the concentric position of the two shafts the coupling details revolve without changing the position to each other. The working principle of the coupling with shafts oscillating against each other in a straight line, or being set in an eccentric position is explained after Fig. 2.

The shaft member carrying pins 1 has its centre at 11 and the shaft carrying the coupling member with slots 5 has its centre at 12. If pins 1 with shaft 11 oscillate exactly parallel to slots 5 the driving frame 2, 4, 2 does not change its shape. Oscillating in any other direction in a straight line driving rods 2 swivel with the length 1 to 3. In oscillating a straight distance from 11 to 12 the driving rods 2 are swiveling on pins 1 from a point 13 to a point 3. This shortens connection 4 a distance 14, if it is yieldable. If the connection is not of a yieldable form the ends 3 move from point 13 to point 15 and driving rods 2 move pins 1 with one shaft accordingly a distance 16. With the eccentricity 11—12 of the shafts parallel to slots 5, thus every 180 degrees, the deviation of driving rods 2 and the distance 16 is zero. With the eccentricity of the shafts at a right angle to slots 5, the deviation of driving rods 2 and distance 16 reaches the maximum. Twice in every revolution the two shafts are accelerated and retarded between zero and a maximum distance 16 resulting in small changes of the circumferential speed. With the yieldable form of connection 4 distances 14 and 16 are reduced and equalized by the yield. It is an advantage of this coupling to allow comparatively long driving rods giving very small differences 14 and 16. The driving rods 2 may also be of a yieldable form.

A preferred arrangement of the coupling is shown in Figs. 3 and 4. A hollow shaft 17 is carrying a coupling member 18 with two driving pins 1 and a driving frame 2, 4, 2. One end of the rods 2 is swiveled on pins 1. Inserted between the other ends is a connection 4, formed by two semiannular spring beams with protruding sliding blocks 19. Said sliding blocks engage a coupling member 20 in slots 5. Coupling member 20 is secured to and revolving with shaft 21. The two annular spring beams are connected by pins 22. Driving rods 2 are provided with spherical bushings 23 and 24 allowing for a limited universal movement of driving rods 2 and shafts 17 and 21. The driving shaft 17 with coupling member 18, pins 1 and driving frame 2, 4, 2 engages slidably and drives in slots 5 coupling member 20 secured to the driven shaft 21. The coupling in this form has the advantage of using little space, it may be applied to comparatively small wheel diameters.

In another preferred form of the coupling shown in Figs. 5 and 6 a shaft 25 is carrying a coupling member 26 and two driving pins 1. Two driving rods 2 are swiveled each one with one end on pins 1. Inserted between pins 3 near the other ends of rods 2 are connections 4 in the form of two semiannular spring beams, connected by pins 22. The driving frame 2, 4, 2 has two slots 27 in driving rods 2. Slots 27 engage sliding blocks 28 swiveled on pins 29 fastened to a coupling member 30 secured to shaft 31. Pins 1 have spherical bushings 23 allowing a limited universal movement for driving rods 2 and shafts 25 and 31. The coupling member 26 on shaft 25 carrying pins 1 and driving frame 2, 4, 2 engages slidably and drives with slots 27 pins 29 on coupling member 30 secured to the driven shaft 31.

In some forms of the coupling slots 27 are parallel to the driving rods 2. The driving frame 2, 4, 2 may be carried by either shaft and coupling member. Also the yielding means in the driving frame may be omitted in connection 4 and placed in the driving rods 2.

Another advantage of the coupling is, that the semiannular spring beams 4 in most cases do not require a stop to limit the flexibility, and if one of the springs should break the power transmission is not interrupted. All rotating parts in this coupling are balanced. It will of course be understood, that the structure of the different forms of the coupling may be otherwise modified within the scope of the appended claims.

Having thus described my invention, I claim as new and desire to secure by Letters Patent:

1. In a flexible coupling of the character described the combination of a driving and a driven shaft, a coupling member with two driving pins carried by one of the two shafts, two driving rods of about equal length journaled each one with one end on said driving pins, a connection pivotally inserted between the diagonal opposite other ends of the two driving rods, said two driving rods and the connection forming a driving frame revolving with said one shaft and coupling member, means provided on said driving frame to engage and to drive slidably a coupling member secured to and revolving with the other shaft.

2. In a flexible coupling of the character described the combination of a driving and a driven shaft, a coupling member with two driving pins carried by one of the two shafts, two driving rods of about equal length journaled each one with one end on said driving pins, a connection pivotally inserted between the diagonal opposite other ends of the two driving rods, said connection being yieldable and forming with the two driving rods a driving frame revolving with said shaft and coupling member, means provided on said driving frame to engage and to drive slidably a coupling member secured to and revolving with the other shaft.

3. A flexible coupling of the character described, comprising a driving and a driven shaft, a coupling member with two driving pins revolving with one of the shafts, two driving rods of about equal length journaled each one with one end on said driving pins, a connection in the form of two semiannular spring beams inserted between the diagonal opposite other ends of the two driving rods, said two driving rods and the connection forming a yieldable driving frame revolving with said shaft and coupling member, sliding blocks protruding from said driving frame to engage and to drive slidably another coupling member in suitable slots, said other coupling member being secured to and revolving with the other shaft.

4. A flexible coupling of the character described, comprising a driving and a driven shaft, a coupling member with two driving pins revolving with one of the two shafts, two driving rods of about equal length journaled each one with one end on said driving pins, a connection in the form of two semi-annular spring beams inserted between the diagonal opposite other ends of the two driving rods, said driving rods and the connection forming a yieldable driving frame revolving with said shaft and coupling member, slots provided in the driving frame to slidably engage sliding blocks journaled on pins carried by another coupling member, secured to and revolving with the other shaft.

ARTHUR LANZ.